United States Patent [19]

Fournier

[11] Patent Number: 5,516,999
[45] Date of Patent: May 14, 1996

[54] PROCESS AND DEVICE FOR FIXING IN A FLUIDTIGHT MANNER A THROUGH TUBE IN A DOME-SHAPED WALL OF A COMPONENT OF A NUCLEAR REACTOR

[75] Inventor: Yves Fournier, Chatenay Le Royal, France

[73] Assignee: Framatome, Courbevoie, France

[21] Appl. No.: 241,654

[22] Filed: May 12, 1994

[30] Foreign Application Priority Data

May 12, 1993 [FR] France .................. 93 05727

[51] Int. Cl.[6] .................................................. B23K 15/00
[52] U.S. Cl. ............................... 219/121.14; 219/121.21
[58] Field of Search ............................. 219/60.2, 121.13,
219/121.14, 121.21, 121.22, 121.23, 121.28,
121.29, 125.11; 228/135, 171, 183, 184;
148/521, 524, 525, 565; 29/890.038, 890.043;
376/260

[56] References Cited

U.S. PATENT DOCUMENTS

| | | | |
|---|---|---|---|
| 3,463,899 | 8/1969 | Foulquier et al. | 219/121.13 |
| 3,783,230 | 1/1974 | Peyrot | 219/121.13 |
| 3,806,693 | 4/1974 | Miller . | |
| 5,091,140 | 2/1992 | Dixon et al. | 376/260 |
| 5,196,160 | 3/1993 | Porowski . | |
| 5,271,048 | 12/1993 | Behnke et al. | 376/260 |

FOREIGN PATENT DOCUMENTS

| | | | |
|---|---|---|---|
| 312421 | 4/1989 | European Pat. Off. . | |
| 2045605 | 3/1971 | France . | |
| 2129852 | 11/1972 | France . | |
| 2233130 | 1/1975 | France . | |
| 2495734 | 6/1982 | France . | |
| 53-045641 | 4/1978 | Japan | 219/121.21 |
| 53-091040 | 8/1978 | Japan | 219/121.14 |
| 55-048487 | 4/1980 | Japan | 219/121.13 |
| 63-080972 | 4/1988 | Japan | 219/125.11 |
| 2094200 | 9/1982 | United Kingdom | 219/121.21 |

OTHER PUBLICATIONS

Search Report FR 93 05727 Jan. 1994.

Primary Examiner—Teresa J. Walberg
Assistant Examiner—Gregory L. Mills
Attorney, Agent, or Firm—Pollock, Vande Sande & Priddy

[57] ABSTRACT

The through tubes (8) are a shrink-fit in through openings in the dome-shaped wall (2). One end (8a) of the tubes which projects from the convex surface of the wall (2) is closed in a fluidtight manner and a wall (18) carrying an electron gun (19) is mounted and fixed in a fluidtight manner on the dome-shaped wall (2) so as to define a fluidtight chamber (24). A low pressure is created in the fluidtight chamber (24) and the electron beam firing axis (19a) of the electron gun (19) is directed along a generatrix of the joint region between a through tube (8) and a through opening in the dome-shaped wall (2). The joint region is scanned by the electron beam by displacing the electron gun (19) in rotation about the axis of the through tube (8). The invention is in particular applicable to the welding of through adapters (8) of a vessel cover (2) of a pressurized water nuclear reactor.

4 Claims, 4 Drawing Sheets

PROCESS AND DEVICE FOR FIXING IN A FLUIDTIGHT MANNER A THROUGH TUBE IN A DOME-SHAPED WALL OF A COMPONENT OF A NUCLEAR REACTOR

FIELD OF THE INVENTION

The invention relates to a process for fixing in a fluidtight manner a through tube in a dome-shaped wall of a component of a nuclear reactor, and in particular in the bottom or the cover of the vessel of a pressurized water nuclear reactor.

BACKGROUND OF THE INVENTION

Pressurized water nuclear reactors comprise a vessel of generally cylindrical shape which is placed, in the service position, with its axis vertical, and which comprises a closing cover in its upper part and a dome-shaped bottom in its lower part.

Extending through the cover of the vessel are adapters in the form of vertically disposed tubes which allow the passage of extensions of control clusters controlling the reactivity of the core disposed inside the vessel, or of thermocouple columns whereby it is possible to measure the temperature in different regions of the core of the reactor during its operation.

The adapters comprise a portion which projects above the cover of the vessel and may be of great height, the upper end of which, in the case of adapters allowing the passage of extensions of control clusters, carries a mechanism controlling the displacement of an extension and a control bar.

Extending through the dome-shaped bottom of the vessel are a plurality of substantially vertical tubes termed vessel bottom penetrations.

These vessel bottom penetrations comprise an end portion which projects below the dome-shaped bottom and is connected to a flexible measuring conduit whereby it is possible to connect the bottom of the vessel to an instrumentation room disposed in the building structure of the reactor.

Each of the measuring conduits and the corresponding vessel bottom penetration allows the passage of a thimble in which is displaced a measuring probe fixed to the end of a flexible element of great length and the introduction into the interior of the vessel and of the core of the measuring probe for effecting measurements, for example of the neutron flux or the temperature within the core during operation of the reactor.

The through adapters of the cover of the vessel and the vessel bottom penetrations are usually composed of nickel alloy and are fixed by welding to the cover or to the dome-shaped bottom of the vessel, which are made of a steel of high strength.

The through tubes, whether adapters or vessel bottom penetrations, are engaged in cylindrical through openings produced by drilling the cover or the dome-shaped bottom of the vessel.

Generally, the through openings have a diameter slightly less than the nominal diameter of the through tubes at the ambient temperature, and the tubes are mounted after having brought them to a low temperature, for example to the temperature of liquid nitrogen. In this way, the tube is gripped by a shrink-fit in the dome-shaped bottom.

The fluidtight fixing of the through tube in the dome-shaped wall is completed by a weld produced on the concave surface side of the dome-shaped bottom around the end of the tube, which projects from or is substantially flush with this concave surface.

Generally, the weld is effected by deposit of a filler metal in an annular bevel machined in the dome-shaped wall in the region of its concave surface around the through opening for the tube.

In the case of tubes of nickel alloy, the bottom of the annular welding bevel is covered prior to welding with a buttering coating of nickel alloy similar to the alloy of the through tube. The filler metal deposited in the welding bevel itself has a composition similar to or very close to the composition of the nickel alloy of the through tube.

The welding is generally effected by an arc welding process and requires many successive passes in order to fill the bevel with the filler metal.

The process for mounting and welding a through tube of a dome-shaped wall of a nuclear reactor vessel which requires many successive operations is consequently complex, long and costly. Owing to the fact that the weld is produced by deposit of a relatively large amount of liquid metal in the bevel, the shrinkage of the metal upon solidification creates considerable local deformations in the welded region and a region of high residual stresses. If the metal of the tube is subject to corrosion under the effect of tension, a crack may appear in service. Consequently, after a certain period of operation of the nuclear reactor, the through tubes may show cracks produced by corrosion under tension, in particular in the region of the weld between the through tube and the dome-shaped wall.

It may then be necessary to repair or replace the defective through tube.

In the case where the defective tube is replaced, the operations for positioning and welding the tube may be relatively long and costly, even if the weld produced by the deposit of filler metal is effected inside a narrow bevel of small volume machined in the metal of the weld of the tube being replaced.

In the case of through adapters of vessel covers, the complete replacement of the cover has been envisaged in the case where adapters showed cracks, so as to ensure perfect safety after changing the cover and again starting up the nuclear reactor. In this case, it may be necessary to have very rapidly available a new vessel cover in order to reduce as far as possible the shut-down time of the nuclear reactor.

Owing to the fact that the vessel cover is a very expensive component, it is preferable to manufacture replacement vessel covers on order and for a precise utilization.

It is therefore desirable to reduce as far as possible the time it takes to manufacture vessel covers.

More generally, it is of course also necessary to reduce as far as possible the time it takes to manufacture the whole of the vessel of a nuclear reactor so as to limit manufacturing costs.

Among the operations necessary for manufacturing a nuclear reactor vessel which have a tendency to lengthen the manufacturing time, the fluidtight fixing of the through tubes of the cover and of the bottom of the vessel is particularly important, owing to the large number of through tubes.

It is therefore quite desirable to reduce as far as possible the time required to fix in a fluidtight manner the adapters and the vessel bottom penetrations.

It is also desirable to have available a process for rapidly and inexpensively replacing defective adapters or vessel bottom penetrations of a nuclear reactor, following a certain period of operation.

SUMMARY OF THE INVENTION

An object of the invention is therefore to provide a process for the fluidtight fixing of a through tube in a substantially dome-shaped wall of a component of a nuclear reactor, and in particular of a through tube of the bottom or of the cover of the vessel of a pressurized water nuclear reactor, by engagement and shrink-fitting of the through tube in a corresponding through opening of the substantially dome-shaped wall in a substantially cylindrical joint region, so that the tube has an outer projecting end portion at least on the side of the convex surface of the substantially dome-shaped wall and by welding of the shrink-fitted tube in the junction region. The process permits considerably reducing the deformations and the stresses created upon the welding of the tube and the construction time and manufacturing costs of the substantially dome-shaped wall and of the component or of the replacement of a through tube.

For this end, the process comprises, after shrink-fitting of the through tube:

closing in a fluidtight manner the outer projecting end portion of the through tube extending through the substantially dome-shaped wall, fixing in a fluidtight manner on a part of the component a wall which is complementary to the substantially dome-shaped wall and which carries an electron gun so as to define with the concave inner surface of the substantially dome-shaped wall a fluidtight chamber in which the electron gun is capable of firing an electron beam, creating a low pressure inside the fluidtight chamber, directing the firing of the electron gun along a generatrix of the joint region, and rotating the electron gun about the axis of the through tube so as to cause the electron beam to scan the joint region.

BRIEF DESCRIPTION OF THE DRAWINGS

In order to further explain the invention, there will now be described, by way of example with reference to the accompanying drawings, an embodiment of the process according to the invention used for the fluidtight fixing of through adapters of a cover of a vessel of a pressurized water nuclear reactor.

DETAILED DESCRIPTION

Figure 1:
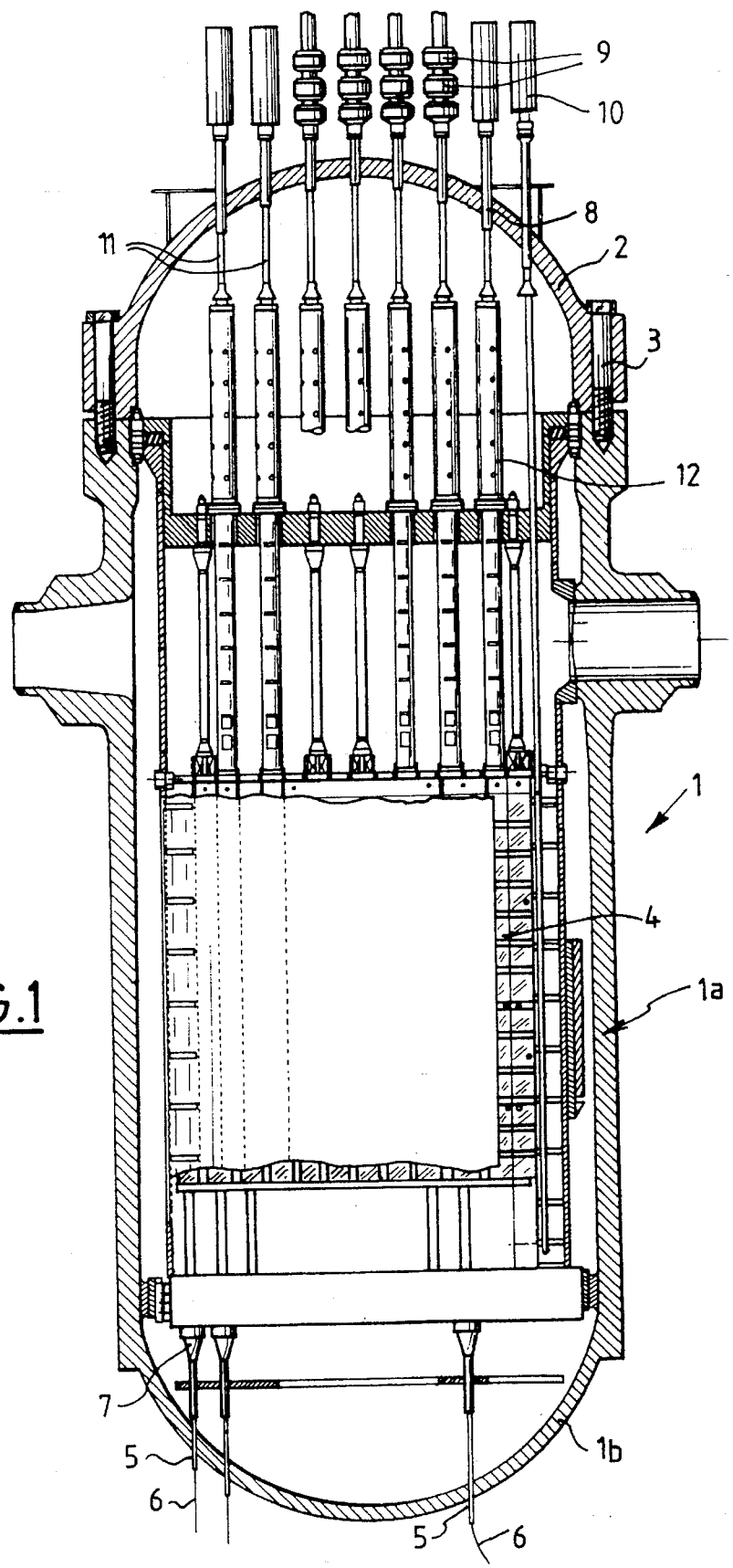
FIG. 1 is a schematic sectional view in a vertical plane of the vessel of a pressurized water nuclear reactor.

Shown in FIG. 1 is the vessel 1 of a nuclear reactor.

The vessel comprises a substantially cylindrical outer care 1a shape closed at its lower end by a substantially hemispherical dome-shaped bottom 1b.

The upper end of the case 1a of the vessel 1 may be closed by a substantially hemispherical cover 2 which rests on a bearing surface in the upper part of the case 1 and is fixed in a fluidtight manner to the case 1 by clamping studs 3. The vessel 1 encloses the core 4 of the nuclear reactor constituted by fuel assemblies of prismatic shape disposed in a juxtaposed manner.

Extending through the bottom 1b of the vessel are vessel bottom penetrations 5 in the form of tubes which have lower ends projecting out of the dome-shaped bottom 1b each of which is connected to an instrumentation guiding conduit 6.

Above and inside the substantially dome-shaped bottom 1b, the vessel bottom penetrations 5 each comprise a projecting upper end portion which is engaged in an instrumentation guiding column 7.

The guiding conduit 6, the vessel bottom penetrations 5 and the columns 7 permit the passage of thimbles enclosing measuring probes between the instrumentation room of the nuclear reactor and the core 4 disposed within the vessel.

Extending through the cover 2 are tubular adapters 8 which have upper ends projecting above the cover 2 on which are fixed either mechanisms 9 controlling a cluster adjusting the reactivity of the core, or supports 10 for a thermocouple column for measuring the temperature inside the core.

Disposed inside the adapters 8 ensuring the passage of a control rod of a cluster adjusting the reactivity which is displaced in the vertical direction by mechanisms 9, are thermal sleeves 11 comprising a lower end part extending into the interior of the vessel.

Disposed inside the vessel 1 above the core 4 are upper internal equipments 12 of the nuclear reactor which include elements for guiding in the vertical direction adjusting clusters, in the extension of the thermal sleeves 11, and elements for guiding the thermocouple columns.

In the case of pressurized water nuclear reactors having a power of 1,300 MWe, the cover of the reactor vessel has extending therethrough 77 adapters distributed in a central region of the cover.

Likewise, the vessel bottom has extending therethrough many penetrations each connected to a measuring conduit.

The through adapters of the cover of the vessel and the vessel bottom penetrations are usually made of nickel alloy, whereas the cover and the bottom of the vessel are made of high strength low alloy steel.

The through adapters of the vessel cover and the vessel bottom penetrations are fixed in a fluidtight manner in openings extending through the cover or the substantially dome-shaped bottom, so as to ensure a perfectly tight passage with respect to the water contained within the vessel of the reactor. In operation, this water has a temperature of around 310° C. and whose pressure of 155 bars. This arrangement also ensure, that the connection between the through tube and the corresponding substantially dome-shaped wall is sufficiently strong to avoid any risk of ejection under the effect of the pressure prevailing within the reactor vessel in operation.

Figure 2:
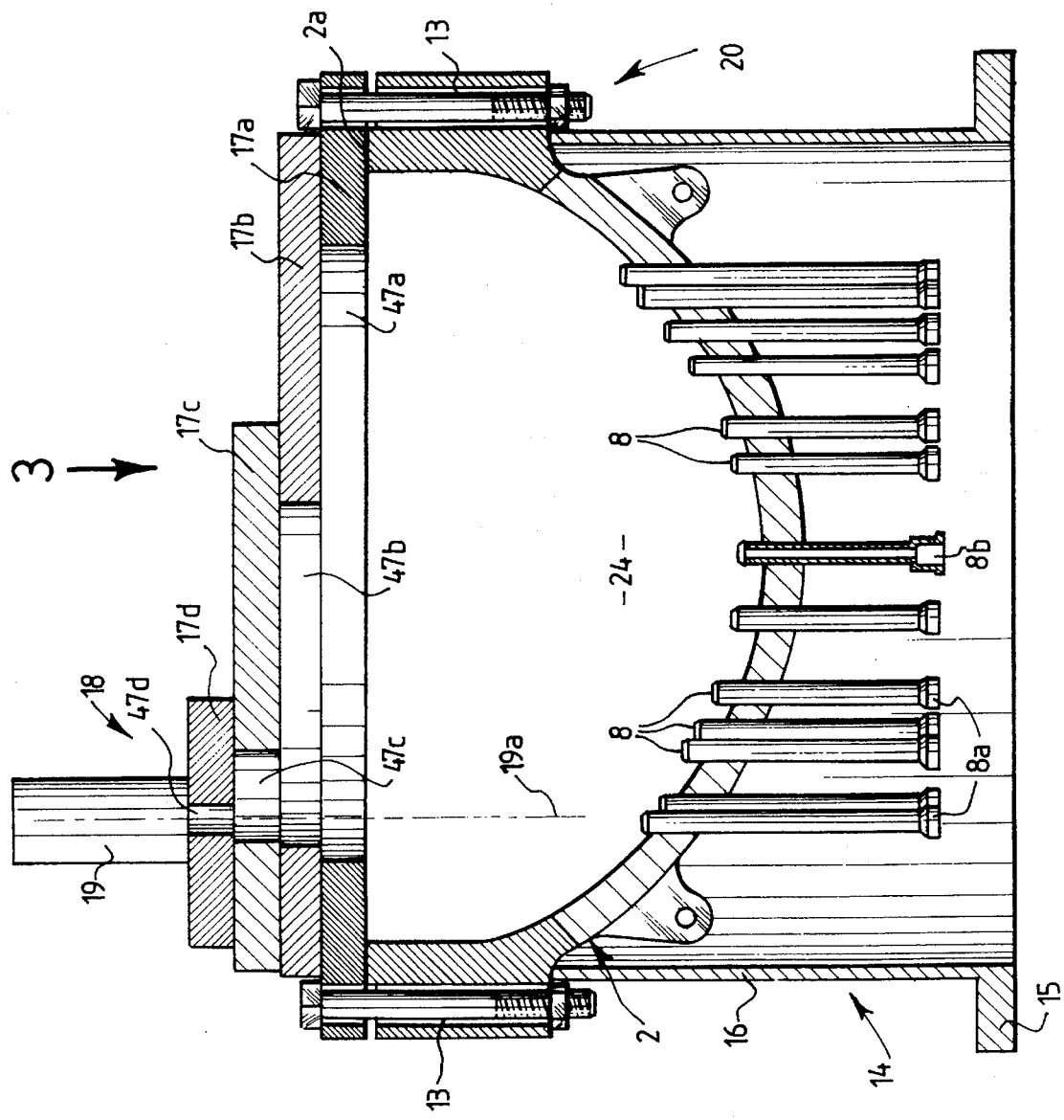
FIG. 2 is a sectional view in a vertical plane of a vessel cover of a pressurized water nuclear reactor and of a device for electron beam welding of through adapters of the cover.

FIG. 2 shows the closing cover 2 of the vessel of a nuclear reactor such as that shown in FIG. 1 during a step of the process for fixing the adapters 8 in a fluidtight manner according to the invention.

The cover 2 is placed on an intervention stand 14 in an inverted position relative to its service position in which the cover closes the nuclear reactor vessel, i.e., with its outer convex surface facing downwardly, this position being termed the bowl position of the cover.

The stand 14 comprises an annular base 15 resting on the ground of the workshop manufacturing the cover and a support sleeve 16 disposed with its axis vertical and fixed by its lower end to the annular base 15. A peripheral outer part of cover 2 in the form of a flange rests on the upper end of the support sleeve 16 openings 13 for the passage of studs 3 extend through this flange for fixing the cover to the vessel.

In FIG. 2, the cover has been shown during a step of the process for fixing adapters 8 in a fluid tight manner, by electron beam welding of an inner peripheral part of the adapters 8 to the cover 2.

This electron beam welding is done by a device 18 comprising four superimposed plates 17a, 17b, 17c and 17d and an electron gun 19 fixed on the first plate 17d constituting the outer upper part of the assembly of superimposed plates.

Figure 3:
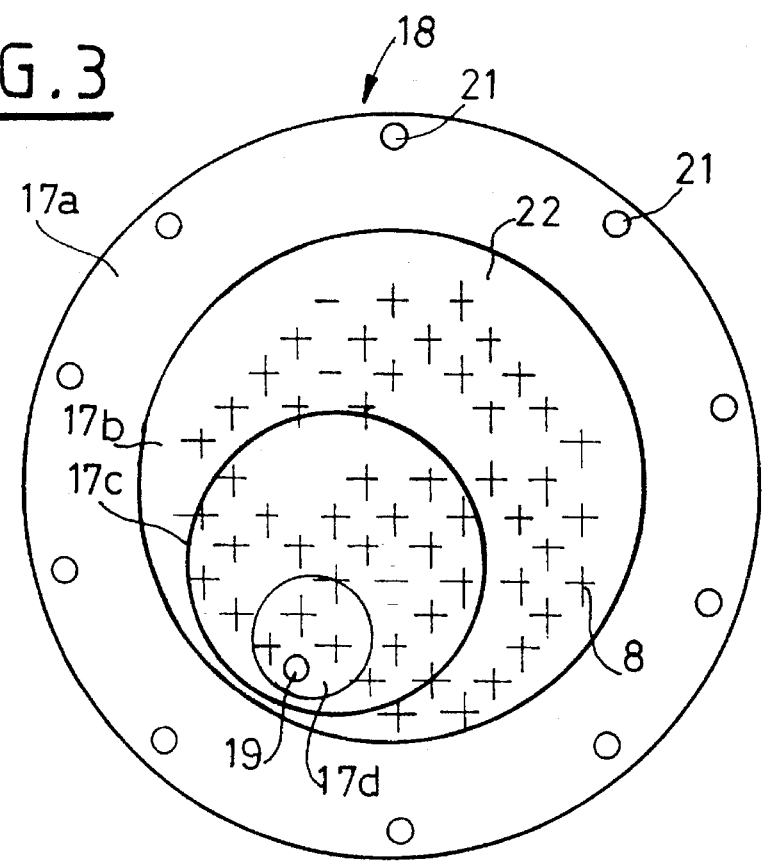
FIG. 3 is a top plan view in the direction of arrow 3 of FIG. 2.

As more clearly visible in FIG. 3, the first plate 17a constituting the support of the welding device 18 rests on the peripheral bearing surface 2a of the cover 2 and includes through openings 21 in alignment with the openings 13 for fixing the cover in which are engaged fixing assemblies 20 each comprising a long bolt and a nut.

The first plate 17a is fixed in a fluidtight manner to the bearing surface 2a of the cover 2 with interposition of a sealing element, as will be explained hereinafter with reference to FIG. 4, which shows the mounting of the plates of the welding device 18 in greater detail.

The number of the openings 21 is smaller than the number of the openings 13 for fixing the cover; indeed, the assemblies 20 merely serve to close in a fluidtight manner the upper end of the cover in a fluid tight manner and are not subjected to great tensile stress resulting from overpressure inside the cover.

Further, as can be seen in FIG. 3, the plate 17b which is centered relative to the plate 17a which is itself mounted on the bearing surface of the vessel cover, has a diameter such that it covers the entire section of the inner upper opening of the cover. Consequently, all of the through adapters 8 are located below the plate 17b.

The plate 17c is mounted on the plate 17b in an off-center position and has such diameter that it is capable of scanning or passing over the entire region occupied by the through adapters 8 on the inner surface of the cover 2, when the plate 17b is rotated about its vertical axis relative to the fixed plate 17a.

The fourth plate 17d is fixed on the plate 17c in an off-center position and carries the electron gun 19, which is itself fixed in an off-center position relative to the vertical axis of the plate 17d.

Extending through the second plate 17b is an opening in which is fixed a nozzle 22 which puts a chamber 24, defined by the inner surface of the cover 2 and the plates of the welding device 18, in communication with a pump installation which may be used for creating a low or reduced pressure in the inner chamber 24 of the cover 2.

Figure 4:
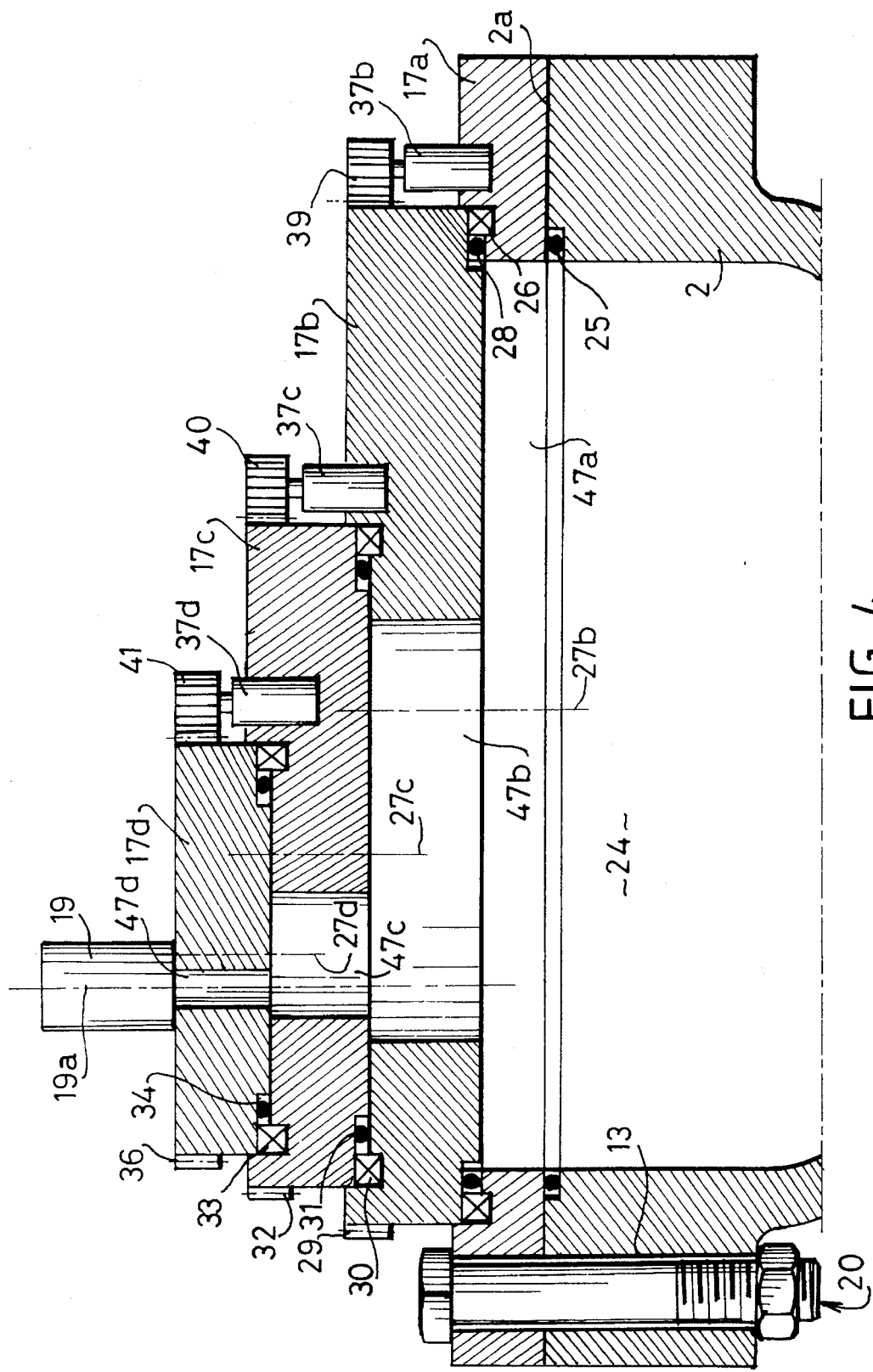
FIG. 4 is a sectional view of the device for welding of the through adapters, in operating position on the vessel cover.

As can be seen in FIG. 4, the first plate 17a is placed on the peripheral bearing surface 2a of the cover 2 with interposition of a sealing element 25 and fixed by the bolt and nut assemblies 20 permitting sufficient clamping of the sealing element 25 to ensure fluidtight closure of the inner chamber 24 of the cover 2.

Rolling means 26 are mounted to rotate about horizontal axes inside a groove machined in the first plate 17a. The second plate 17b rests on the rolling means 26 so as to be rotatable on the first plate 17a about its vertical axis 27b, which is coincident with the axis 27a of the first plate. The rolling means 26 are then in an upper position allowing the plate 17b to be raised slightly above the plate 17a.

A sealing element 28 is interposed between the fixed first plate 17a and the second plate 17b mounted to rotate on the first plate about its axis 27b.

When the plate is in the upper position, the sealing element 28 continues to provide a seal or fluidtightness between plates 17a and 17b and opposes only limited resistance to the slow rotation of the plate 17b.

When the rolling means are in a lower position, they retract within the plate 17a and the plate 17b comes to bear against the plate 17a through the sealing element 28.

The upper part of the second plate 17b is machined on its peripheral surface so as to constitute straight teeth 29 similar to the teeth of a gear wheel or ring.

The third plate 17c bears against the second plate 17b through rolling means 30 and an annular sealing element 31 similar to the rolling means 26 and the sealing element 28 interposed between the plates 17a and 17b.

The axis of rotation 27c of the third plate 17c on the second plate 17b is offset relative to the axis 27b of rotation of the second plate 17b relative to the fixed plate 17a.

The upper part of the third plate 17c is machined in the upper part of on its peripheral surface so as to constitute straight teeth 32 similar to the teeth of a gear wheel or ring.

The fourth plate 17d bears against the third plate 17c through rolling means 33 disposed in a groove machined in the upper surface of the third plate 17c. Further, a sliding sealing element 34 is interposed between the third plate 17c and the fourth plate 17d.

The axis of rotation 27d of the fourth plate 17d on the third plate 17c is offset from the axis 27c of rotation of the third plate 17c on the second plate 17b.

The upper part of the peripheral surface of the fourth plate 17d is machined so as to constitute straight teeth 36 similar to the teeth of a gear wheel or ring.

The electron gun 19 has an axis 19a along which it fires an electron beam in a vertical direction, this axis being placed in an off-center position relative to the axis of rotation 27d of the fourth plate by a distance substantially equal to the radius of the outer surface of an adapter 8.

Motor-speed reducer units 37b, 37c and 37d for respectively driving the plates 17b, 17c and 17d in rotation are fixed on the plate 17a, the plate 17b and the plate 17c, respectively, so that their output shafts are vertical.

The output shaft of the motor-speed reducer unit 37b carries a gear pinion 39 which is engaged with the gear teeth 29 of the second plate 17b.

The output shaft of the second motor-speed reducer unit 37c carries a driving pinion 40 which is engaged with the gear teeth 32 of the third plate 17c.

The output shaft of the third motor-speed reducer unit 37d carries a driving gear pinion 41 which is engaged with the gear teeth 36 of the fourth plate 17d.

The motor-speed reducer units 37b and 37c include control means for displacing the rotary plates 17a and 17c in such manner as to scan the whole of the region of the cover 2 in which the adapters 8 are disposed, as will be described hereinafter.

Prior to the electron beam welding constituting the essential step of the process according to the invention, various steps are carried out for mounting the adapters 8 on the cover in their welding position.

Figure 5:
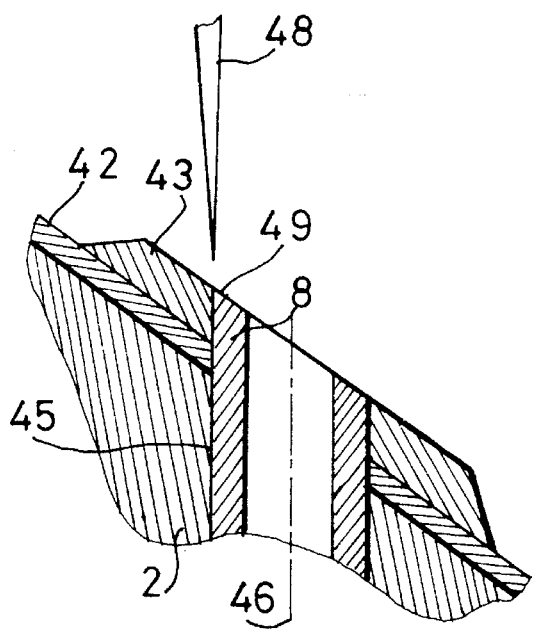
FIG. 5 is a sectional view, on a larger scale, of an inner end part of a through adapter in the course of electron beam welding to the vessel cover.

Reference will be made to FIGS. 2 and 5 for describing these steps prior to welding.

After forming and machining, the cover 2 is coated on its inner surface, by fusion and deposit of filler metal, for example by using an arc welding torch, with a layer of stainless steel of a thickness of a few millimeters. This layer of stainless steel 42 or buttering layer is similar to a build up layer on a metal surface.

As shown in FIG. 5, heels 43 constituted by a buttering layer of nickel alloy having a thickness on the order of 20 mm are then disposed on the buttering layer 42.

In an alternative embodiment, the heels 43 may be deposited directly on the basic metal 2 by interrupting layer 42 in the corresponding region.

The heels 43 are disposed in discontinuous regions on the buttering layer 42 in the region of each of the through adapters 8, as can be seen in FIG. 5.

A heel 43 may also be provided and deposited in a continuous manner throughout the region of the through adapters.

Precise drilling of the cover of the vessel is then effected for producing the openings 45 for the passage and fixing of the adapters 8, in each of the regions of the inner surface of the cover 2 covered by a heel 43 constituted by a nickel alloy similar to the alloy of the through adapters 8.

Each of the through openings 45 has a vertical axis 46 placed in a perfectly determined position corresponding to the axis of an adapter to be placed in the cover 2 of the vessel. The diameter of the openings 45 is slightly smaller than the nominal outside diameter of the adapters 8 at ambient temperature.

The adapters 8 are then mounted in the openings 45 by bringing the end portion intended to be engaged in the wall of the cover 2 to the temperature of liquid nitrogen. The adapters 8 are inserted in the openings 45 and heated to the ambient temperature so as to shrink-fit the inner end portion of the adapter in the opening 45 extending through the vessel cover and the buttering layers 42 and 43.

The adapters 8 are assembled by a shrink-fit in the openings 45 on a joint surface having a cylindrical shape and a vertical axis 46.

The cover 2 in which all of the through adapters 8 have been fitted is then placed on the intervention stand 14 in the position shown in FIG. 2.

The welding device 18 is brought as a unit over the bearing surface 2a of the cover 2 and placed on this surface so that the first fixed plate 17a perfectly overlaps the bearing surface 2a. The welding device 18 may be placed in position, for example by using an overhead crane and providing hoisting lugs on the first fixed plate 17a.

Prior to the positioning of the welding device 18 on the bearing surface 2a of the cover 2, a sealing element 25 is placed in the recess on the inner periphery of the cover 2.

The fixed plate 17a is assembled with the bearing surface 2a in such position that the openings extending through the peripheral part of the plate 17a each come into perfect alignment with a respective opening 13 for fixing the cover.

The welding device 18 is fixed in a fluidtight manner on the bearing surface 2a of the cover 2 by means of the bolt and nut assemblies 20 engaged in the aligned openings of the fixed plate 17a and the cover 2, the plate 17a being clamped against the bearing surface 2a with interposition of the sealing element 25.

The mounting and the shrink-fitting of the trough adapters 8 by means of nitrogen are achieved in such manner that the adapters have an outer end 8a disposed adjacent the outer convex surface of the cover 2 at a given distance in the vertical direction from this convex surface, and an inner end portion which projects slightly inwardly of the cover with respect to the concave inner surface of the latter.

The outer ends 8a of the adapters 8 are all disposed in the same plane perpendicular to the axes of the adapters and to the axis of the cover.

Engaged in the outer ends 8a of the adapters 8, on which control mechanisms may for example be mounted, are plugs 8b (FIG. 2) which provide a fluidtight closure so as to complete the fluidtight closure of the chamber 24.

The inner end portion of the adapters, which project slightly from the inner concave surface of the cover 2, is machined so as to be flush with the inner surfaces of the buttering layers of nickel alloy constituting the heels 43, as shown in FIG. 5.

A low or reduced pressure is created in the chamber 24 which is closed in a fluidtight manner by the device 18, via the pump circuit connected to the nozzle 22 extending through the plate 17b.

The shrink-fitting by means of nitrogen of the through adapters 8 in the through openings 45 in the vessel cover ensures a sufficiently fluidtight joint between the adapters and the vessel cover openings to allow creating a low pressure in the chamber 24 which is required for carrying out the electron beam welding operation.

The plates 17b, 17c and 17d are oriented in such manner that the axis 19a along which the electron beam is emitted by the gun 19 is disposed along a generatrix of a first cylindrical joint region between a first adapter 8 and the corresponding through opening 45 of the vessel cover. The axis 27d of the plate 17d is then directed along the axis of the adapter 8 and of its through opening 45.

The rotary plates 17b, 17c and 17d are placed in position by rotating through the required angle the plate 17b on the plate 17a, the plate 17c on the plate 17b about their respective axes of rotation 27b and 27c.

This rotation is produced by the corresponding driving motor-speed reducer units 37b and 37c engaged with the gear wheel constituting an upper part of the periphery of the respective plate.

The plates are rotatively mounted by means of bearing rollers which may be placed in a retracted position so as to place each plate on a corresponding sealing element subsequent to the rotation of the plates to bring the axis 19a of the electron beam to the required position. Each of the rotary plates 17b, 17c then comes to bear against a respective sealing element 28, 31 carried by the plate 17a or 17b. The weight of the plates bearing against the sealing elements sufficiently crushes the sealing elements to provide a good seal.

The plates are therefore perfectly immobile and bear against each other when a low pressure is created inside the enclosure 24.

As mentioned before, when the plates, such as 17b and 17c, are raised for the purpose of rotating them, the sealing elements such as 28 and 31 on which they rest continue to provide the seal with the lower plate, such as 17a or 17b, so that the enclosure 24 remains fluidtight and the vacuum can be maintained even when the plates are rotated.

The fourth plate 17d is rotatively mounted in a fluidtight manner by means of a sliding sealing element 34 on the third plate 17c so as to shift the electron gun in rotation and scan by means of the electron beam 48 directed along the firing axis 19a and shifted in rotation by the plate 17d, about the axis 46 of the through adapter 8 and of the opening 45 in alignment with the axis of rotation 27d of the plate 17d.

Figure 6:
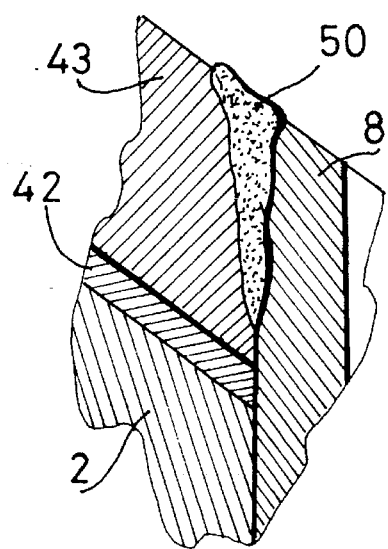
FIG. 6 is a view on a larger scale of the electron beam welded region of the adapter.

In this way there is produced a fusion of the metal of the adapter 8 and of the heel 43 in a thin region 49 of cylindrical shape. The solidification of the molten metal of the region 49 after the passage of the electron beam 48 provides a weld bead 50 such as that shown in FIG. 6, providing a fluidtight joint between the adapter 8 and the heel 43 which are made of the same nickel alloy. The welding is therefore effected between perfectly compatible materials.

The molten region 49 has a very small volume, and the amount of heat transmitted by the electron beam 48 to the parts to be joined is also very small. There is consequently very little deformation of the parts in the vicinity of the weld bead and considerable reduction in the residual tensile stresses in the through adapter as compared with the process of the prior art.

Moreover, the height of the weld bead 50 in the axial direction of the adapter 8 may easily be arranged at a value greater than or equal to the thickness of the adapter, this condition being necessary to obtain a weld providing satisfactory fluidtightness and mechanical fixing properties. Furthermore, the weld obtained is of very high quality and can easily be inspected.

Other extremely important advantages result from the process according to the invention. In particular, the time required to weld an adapter is considerably reduced relative to the time required to weld an adapter by a process of the prior art with a deposit of a filler metal in a bevel. Indeed, the processes of the prior art require many successive passes to fill the bevel with the filler metal.

It will be clear that the small amount of heat transmitted to the parts to be joined at the moment of welding and the small volume of the molten region prevent marked deformations of the adapter and the creation of considerable stresses on the inner surface of the adapter in the vicinity of the welded region. Thus, the tendency of the adapter to corrode under tension when it comes into contact with the primary fluid of the reactor is avoided.

When a first adapter has been welded, the plates 17b and 17c are rotated so as to align the firing axis 19a of the electron gun 19 on a generatrix of the joint region of a second adapter. The rotation of the plates 17b and 17c is then stopped and they are then made to bear against their sealing elements in their new position permitting the alignment of the firing axis of the electron gun with a generatrix of a joint region of the new adapter 8 and the alignment of the axis of the plate 17d with the axis of the new adapter 8.

The new adapter is welded as previously described.

In this way it is possible, by successive displacement of the plates 17b and 17c, then a rotation through a complete turn, or preferably through a little more than one turn, of the plate 17d, to weld all of the through adapters of the cover.

The displacements of the plates, and in particular of the plates 17b and 17c, can be controlled in such manner as to position the firing axis of the electron gun successively and automatically on the joint regions of successive adapters.

In this way all the adapters 8 extending through the cover 2 are welded.

Each of the plates 17a, 17b, 17c and 17d has a respective through opening 47a, 47b, 47c and 47d which has such dimension and disposition that the openings of the four plates are constantly in alignment with the firing axis 19a to allow the passage of the electron beam 48 from the electron gun 19 to the fluidtight chamber 24 onto which the junction region of the adapters opens.

As can be seen in FIG. 5, the machining of the inner end of the adapter 8 to a flush position permits direct access of the electron beam 48 to the inner end of the joint region between the adapter 8 and the opening 45 in which the latter is engaged. Consequently, the weld may be effected exactly along the cylindrical joint region between the adapter and the through opening of the cover.

The distance between the electron gun and the inner end of each of the adapters essentially varies from one adapter to another, for example in an axial sectional plane, as shown in FIG. 2.

The variation in the distance between the electron gun and the region to be welded may be accommodated either by a vertical displacement of the electron gun on the plate 17d or by a variation in the conditions of the focusing of the electron beam 48.

This variation is taken into account before starting the welding of each through opening and is ensured in a continuous manner during welding by a position control means.

The process for fixing a through tube according to the invention greatly reduces the time required for the construction of a nuclear reactor vessel. Further, the through tubes fixed by the process according to the invention are subjected to very much lower stresses than in the case of the processes of the prior art and have very much less tendency to crack under the effect of corrosion under tension.

The inventive process may be employed for fixing vessel bottom penetrations in the substantially dome-shaped bottom of the vessel.

To this end, there is employed a device comprising at least one support plate for an electron gun which may be fixed inside the vessel above the dome-shaped bottom and which provides fluidtight insulation of the dome-shaped bottom by means of an inflatable peripheral sealing element which comes to bear against the inner surface of the vessel after the electron gun support plate has been placed in position.

It will be quite clear that there may be used for welding vessel bottom penetrations an assembly of superimposed plates such as those described in the case of welding through adapters of the cover of the vessel comprising a fixed support plate on the periphery of which an inflatable sealing element is disposed.

The operations prior to the electron beam welding are substantially identical for both the through adapters of covers and the vessel bottom penetrations. In particular, the vessel lower portion of the bottom penetrations projecting downwardly from the dome-shaped bottom must be closed in a fluidtight manner to allow the creation of low or reduced pressure in the enclosure between the plates of the welding device and the substantially dome-shaped bottom of the vessel.

By using a plurality of superimposed plates, each of the vessel bottom penetrations of the nuclear reactor may be welded in succession.

The process according to the invention is equally applicable in the case where a single through tube is fixed in a substantially dome-shaped wall such as the cover or the bottom of the vessel of a nuclear reactor. Such an operation may be necessary for replacing a through adapter or a vessel bottom penetration which has become defective in service.

In the case of the welding of a single through tube in the course of the intervention on the cover or the bottom of the nuclear reactor vessel, a fluidtight wall constituted by only two superimposed plates may be employed, the upper plate is then rotated on the lower plate for producing the scanning of the electron beam.

The device for electron beam welding of the through tube may differ from the device described and many comprise different rotary plate means for displacing and positioning the electron gun in alignment with the region to be welded.

What is claimed is:

1. A process for fixing in a fluidtight manner at least one through tube in a substantially dome-shaped wall constituting an end of a vessel of a pressurized water nuclear reactor, said substantially dome-shaped wall being composed of a low alloy steel and said at least one through tube being composed of a nickel alloy of a given grade, said process comprising the steps of (a) coating at least partly a concave inner surface of said substantially dome-shaped wall with a buttering layer of stainless steel;

(b) depositing in at least one region of said substantially dome-shaped wall in which at least one through tube is to be fixed a layer of nickel alloy of a grade similar to said given grade of said nickel alloy of said at least one through tube;

(c) producing a respective opening by drilling said substantially dome-shaped wall and said layers of stainless steel and nickel alloy at a diameter slightly smaller than a nominal diameter at ambient temperature of said at least one through tube;

(d) mounting at a low temperature of liquid nitrogen said at least one through tube in said respective opening of said substantially dome-shaped wall constituting a cylindrical joint region for said at least one through tube, so that said tube has an outer projecting end portion at least on a side of a convex surface of said substantially dome-shaped wall;

(e) shrink-fitting said at least one through tube in said respective opening;

(f) closing said outer projecting end portion of said through tube in a fluidtight manner;

(g) fixing in a fluidtight manner on a part of said component a wall which is complementary to said substantially dome-shaped wall and which carries an electron gun, so as to define with a concave inner surface of said substantially dome-shaped wall a fluidtight chamber in which said electron gun is capable of firing an electron beam;

(h) creating a low pressure in said fluidtight chamber;

(i) directing the firing of said electron beam produced by said electron gun along a generatrix of said joint region of said through tube; and (j) rotating said electron gun about an axis of symmetry of said through tube so as to cause said electron beam to scan said joint region and weld said through tube to said substantially dome-shaped wall.

2. Process according to claim 1, wherein said at least one layer of nickel alloy of said substantially dome-shaped wall has a thickness of substantially 20 mm.

3. Process according to claim 1, wherein said at least one through tube is at least one through adapter of a cover of a vessel of a pressurized water nuclear reactor, said process comprising disposing said vessel cover with an internal concave surface thereof facing upwardly on an intervention stand, shrink-fitting said at least one adapter in the respective through opening of said cover and electron beam welding said at least one adapter and the respective covering layer of nickel alloy.

4. Process according to claim 1, comprising shrink-fitting said at least one through tube in the respective through opening extending through said substantially dome-shaped wall so that said at least one through tube has an inner end portion which projects relative to the inner concave surface of said substantially dome-shaped wall and, prior to said electron beam welding of said at least one through tube, machining said projecting end portion of said at least one through tube down to a level of a surface of the respective layer of nickel alloy.

* * * * *